June 28, 1927.

L. M. DART ET AL

TRAP CHAIN RING

Filed Dec. 29, 1926

1,634,177

Luke M. Dart,
Geo. G. Harris,
INVENTOR

BY Victor J. Evans
ATTORNEY

WITNESS:

Patented June 28, 1927.

1,634,177

UNITED STATES PATENT OFFICE.

LUKE M. DART AND GEORGE G. HARRIS, OF EAGLE LAKE, MAINE.

TRAP-CHAIN RING.

Application filed December 29, 1926. Serial No. 157,851.

This invention relates to a ring for a trap chain, the general object of the invention being to provide means for connecting a trap to a post or log in such a manner that the trap will slide off into the water when an animal is caught, but upward movement of the ring on the post or log will be prevented.

This invention also consists in certain other features of construction and in the combination and arrangement of the several parts, to be hereinafter fully described, illustrated in the accompanying drawings and specifically pointed out in the appended claims.

In describing our invention in detail, reference will be had to the accompanying drawings wherein like characters denote like or corresponding parts throughout the several views, and in which:—

Figure 1:
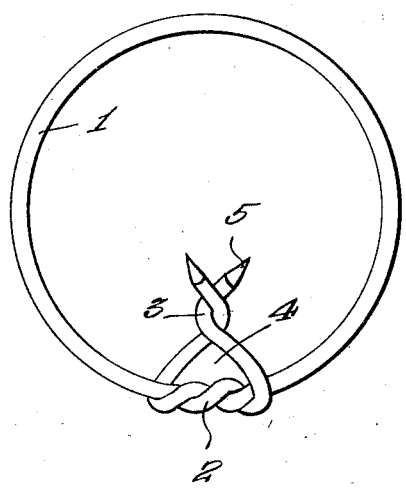
Figure 1 is a view of the improved ring.
Figure 2:
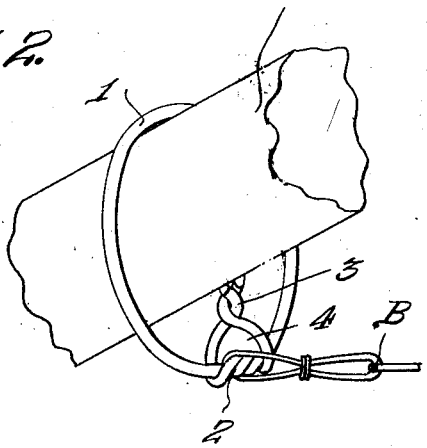
Figure 2 is a view showing the ring in use.

As shown in these views, the ring 1 is made of a strip of wire which, after being formed into ring shape, is twisted together as at 2, and then the extremities are brought together from the outer ends of the twist and fastened together by a half twist, as shown at 3, to form the eye 4 which is located within the ring. The portions extending beyond the half twists diverge and have their extremities sharpened, as at 5. The eye forming parts are bent slightly so that the points will lie to one side of the flat plane of the ring. Thus it will be seen that when the ring is placed on a post, upright or log, as shown at A, with the eye forming parts extended toward the upper end of the member A, the ring can be moved down toward the lower end of the member A, but when an attempt is made to move it upwardly the points will dig into the log and thus prevent the ring from being removed from the log, unless the ring is manipulated by hand to prevent the points 5 from engaging the log. The chain B of the trap is fastened to the eye part so that the pull on the ring exerted by an animal attempting to get out of the trap will cause the lower part of the ring to move upwardly and this movement will cause the points 5 to engage the log which will prevent further movement of the ring. However, the ring can slide downwardly on the log so that when the device is used on a trap placed in water, as soon as an animal is caught, the trap will slide off the place where it has been set and sink, thus drowning the animal, and in this movement of the trap the ring will slide to the bottom of the post or log.

It is thought from the foregoing description that the advantages and novel features of our invention will be readily apparent.

We desire it to be understood that we may make changes in the construction and in the combination and arrangement of the several parts, provided that such changes fall within the scope of the appended claims.

What we claim is:—

1. A device of the class described comprising a ring having inwardly extending prongs, with an eye provided by the prong forming portions.

2. A device of the class described comprising a ring formed of a strip of metal having its ends twisted together, with the portions at the ends of the twist converging inwardly and connected together by a half twist, the converging portions forming an eye and the parts beyond the half twist diverging and having pointed ends.

In testimony whereof we affix our signatures.

LUKE M. DART.
GEORGE G. HARRIS.